Patented Aug. 13, 1935

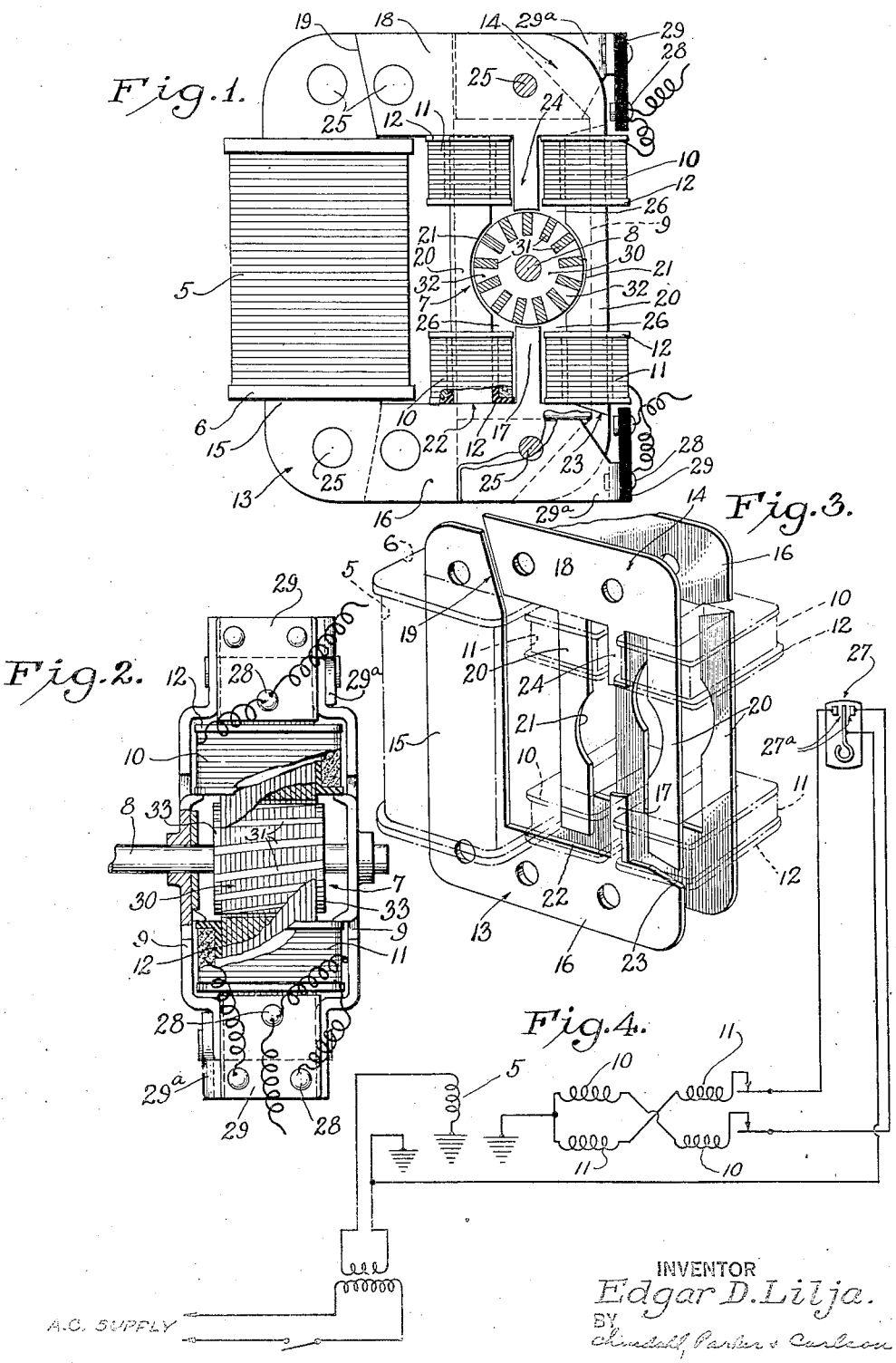

2,010,869

UNITED STATES PATENT OFFICE 2,010,869

INDUCTION MOTOR

Edgar D. Lilja, Rockford, Ill., assignor to Howard D. Colman, Rockford, Ill.

Application May 28, 1931, Serial No. 540,643

20 Claims. (Cl. 172—278)

This invention relates to small fractional horse power induction motors and more particularly to those of the type in which shifting of the magnetic field is produced by the action of shading coils.

The primary object of the invention is to produce a novel motor of the above character which develops a substantial amount of torque and in which starting and stopping of the motor is completely within the control of the shading coil circuits.

Another object is to provide a motor which possesses the above characteristics and is reversible.

A further object is to provide a novel construction of the parts of the stator.

The invention also resides in the construction of the shading coils and the manner in which they are connected and controlled.

Still another object is to provide an induction motor controllable by its shading coil circuit and having a novel means by which the motor may be stopped abruptly by electromagnetic braking action.

Other objects and advantages of the invention will become apparent from the following detailed description taken in connection with the accompanying drawing, in which Figure 1 shows on a one and one-half size scale a side view of a motor embodying the features of the invention, one bearing plate and part of the rotor being broken away to show the rotor in section.

Fig. 2 is an elevational view looking from the right of Fig. 1 with parts of the field member and shading coils broken away to show the rotor.

Fig. 3 shows in perspective two of the adjacent stator laminations and illustrates their manner of assembly in the main and shading coils which are shown in phantom.

Fig. 4 is a wiring diagram illustrating how the motor circuits may be controlled by a sensitive switching device.

The motor as herein shown has a stator or field member of the so-called core type and of generally rectangular shape having one side leg enclosed by a primary coil 5 wound on a spool 6. The opposite leg of the stator forms two magnetic poles on opposite sides of a cylindrical recess in which is disposed a rotor 7 of the squirrel-cage type later to be described in detail. The rotor is rigid with a shaft 8 journaled in bearings supported by non-magnetic plates 9 the opposite ends of which are secured to the stator.

Shifting of the magnetic field around the rotor recess is produced by the well known shading ring method. For applications of the motor where reversal of the direction of rotation is required, two shading coils 10 and 11 are mounted on each pole enclosing different sections of the pole on opposite sides thereof. For a purpose to be described later, each is composed of a relatively large number of turns, approximately five hundred in the present instance, of fine copper wire, preferably of approximately No. 34 standard gauge, wound before assembly on the stator on an insulating spool 12. Where the motor is adapted for unidirectional rotation, only one shading coil is required on each pole.

Referring now to Fig. 3, the stator comprises a stack of laminations of magnetic sheet iron each composed of two separately formed parts 13 and 14, both of which are, in the present instance, generally L-shaped in form. The long legs 15 of the parts 13 are inserted in the spool 6 to form the core of the winding 5. The shorter leg 16 projects laterally from the leg 15 and has formed integral therewith a lug 17 terminating at the rotor recess and forming the central portion of one pole.

The part 14 has a short leg 18 with one end adapted, in assembling the laminations, to be brought into abutment with an inclined surface 19 at the free end of the leg 15 of the part 13. Extending laterally from the leg 18 are two substantially straight projections 20 spaced apart in parallel relation and cut away as indicated at 21 so as to receive the rotor 7 between them. When the parts of the lamination are assembled, the ends of the projections form butt joints along surfaces 22 and 23 of the leg 16. A lug 24 alined with and corresponding in shape to the lug 17 projects from the leg 18 midway between the projections 20.

This construction of the laminations permits the use of formed shading coils and enables substantially all parts of the laminations which form the two poles to be made integral with each other. With the four shading coils 10 and 11 arranged in two alined pairs as shown in Fig. 3, each projection 20 is inserted endwise through one pair of coils and its free end thereby brought into abutment with the leg 16 at the same time that abutting relation is established along the line 19. By inserting the legs 15, and the projections 20 of alternate laminations into the coils from opposite ends of the stator as illustrated in Fig. 3, four lapped joints are formed at the corners of the rectangular stator. This results in an extremely rigid construction of the stator when the stack of laminations are secured together as by rivets 25.

The curved surfaces 21 and the end surfaces of the lugs 17 and 24 conform closely to the curvature of the rotor surface and cooperate to define a cylindrical iron surface around the rotor which surface is uninterrupted except for notches 26 of rectangular shape in which the shading coils are disposed. With the core type stator here employed, the power of the motor is not reduced by making the notches relatively deep. The coils 10 and 11 may therefore be made substantially greater in axial length than in their radial thickness. The reduction in the area of the iron surface around the rotor necessitated by the use of preformed shading coils is thereby maintained at a minimum. Another advantage of the present construction of the laminations is that, with the exception of the lugs 17 and 24, all of the parts which define the rotor recess are made integral with each other which enables the recess to be defined accurately in manufacturing.

In motors of the size shown in the drawing, the lugs 17 and 24 are provided in order to divide the space required for the shading coils into a plurality of parts and thereby minimize, as far as possible, the reduction in flux into the rotor resulting from the provision of the shading ring slots. Furthermore, no special advantage would be gained by enlarging the diameter of the coils as would be done if only one shading coil slot were provided in the poles of the size illustrated. However, when the motor is made in smaller sizes, the lugs 17 and 24 may be omitted if desired.

The action of shading rings or coils in causing the magnetic field produced by excitation of the main winding to shift around the rotor is well understood in the art. If the coils 10 are short-circuited, the flux in the sections enclosed by these coils will lag or reach its peak value at a time later than the flux threading the unshaded pole sections, that is the portion formed by the lug 17 or 24 and that enclosed by the coils 11 whose circuits remain open. Thus, the magnetic field threading the rotor shifts around the poles in a clockwise direction causing rotation of the rotor in the same direction.

In a similar way, counter-clockwise rotation is produced when the coils 11 only are short-circuited and the main winding energized by alternating current. In such a case, the unshaded sections of the poles would be those formed by the lugs 17 and 24 and those enclosed by the coils 10 whose circuits are open. In this way, the direction in which the motor will start from standstill may be determined by selective closure of the shading coil circuits.

Considering the fact that the currents in the shading coil circuits are derived by induction and that each shading coil encloses only a portion of the total area of the magnetic path through the poles, it will be apparent that the output of the shading coil circuit is low compared with the input power of the primary winding 5. Accordingly, the burden on the switch mechanism required for controlling the starting and stopping of the motor is very low which renders the motor susceptible of reliable control by a sensitive instrumentality such as a thermostat 27 of the open-contact type. Such control is made possible by the formation of each shading coil with a relatively large number of turns which results in increasing the voltage across the shading coil terminals and a corresponding decrease in the current in the coils. Under these conditions, the resistance of the conductors between the controlling switches and the shading coils is not objectionably high as compared to the resistance of the coils proper. There is, therefore, no substantial loss of available energy externally of the coils; consequently, the magnitude of the current induced in the shading coils is sufficient to produce the required amount of shading. For this reason, the coils may be constructed of fine wire as above described and the thermostat located a considerable distance from the motor without reducing the shading effect to an objectionable degree.

The resistance losses externally of the shading coils may be reduced still further by connecting the corresponding shading coils of each pole of the motor in series relation. Thus, as shown in Fig. 4, the insulated terminals of each pair of shading coils are connected to a switch 27a of the thermostat and the common terminal of the two sets of shading coils leads to the common contact of these switches.

While, from the foregoing it will be apparent that it is desirable to construct the shadings with several hundred turns, the motor may be controlled satisfactorily by a thermostat when a somewhat smaller number of turns are employed. In any case, however, more than one hundred turns should be used where the motor is to be controlled from a sensitive instrumentality.

To avoid damage to the fine wire of which the shading coils are formed, the connections to the shading coils are made at rugged binding terminals 28 (see Fig. 2) on plates 29 of insulation preferably mounted on brackets 29a and lying closely adjacent the outer edge of the stator opposite the winding 5. In this position, the overall dimension of the motor is not materially increased by the addition of the plates 29. The electrically common ends of the shading coils may, if desired, be grounded to the stator and the latter thereby used as a binding terminal.

In the present motor, the stopping as well as the starting of the motor is under the complete control of the shading coils. That is to say, the motor will discontinue to run when the circuits of all of the shading coils are interrupted while the main winding 5 remains excited. For this purpose, the motor is constructed to have such poor single phase characteristics that it will cease to run as a single phase motor when none of the shading coils are effective and yet to have such good polyphase characteristics that it will have sufficient torque to render it useful.

In the present instance, the poor or low single phase characteristic is due in part to the low reactance of the rotor, which preferably comprises a solid laminated core formed by toothed disks 30 and a relatively large number of copper inductor bars 31 of rectangular cross-section set in notches between adjacent teeth 32 of the disks and having one side surface flush with the surface of the core. There are thirteen bars in the rotor illustrated in the drawing and their corresponding ends are made electrically common by copper disks 33 of the same shape as the disks 30. The inductor bars are made of substantially greater radial width than their thickness measured circumferentially of the rotor. This is for the purpose of making the effective iron area of the rotor teeth 32 as large as possible which is especially important in a rotor of such small diameter.

With the rotor thus constructed, there is no complete iron circuit around the individual inductor bars 31. In fact, there is an air gap of substantial width in each of these local magnetic circuits due to the location of the bars so that they are exposed at the surface of the rotor. By thus interrupting the local magnetic circuits of the rotor, the reactance of the rotor is very low and the quadrature field of the motor correspondingly ineffective.

The desirable poor single phase characteristics of the present motor are also due to the core type construction of its stator, for there is no available iron path of low reluctance through which the quadrature field may thread. The only magnetic circuits for this field would be through the poles proper in which case the quadrature field would be opposed by the main and shading coil fields. Also, these circuits are interrupted by the shading coil slots. Thus, the quadrature field in a core type stator is inherently weak.

As a result of these poor single phase characteristics, the torque of the present motor is so materially reduced when the shading coil circuits are interrupted that the motor is not capable of overcoming the load opposing its rotation and will cease to rotate as soon as the short circuit of the active pair of shading coils is broken even though the primary winding 5 continues to remain excited. The motor is thus within the complete control of the switches by which selective closure of the shading coil circuits is controlled.

It will be apparent that the low single phase characteristics and the large slots 26 in the poles of the present motor are conducive to a reduction in the motor output. These detrimental effects are more than compensated for and the motor thereby rendered useful by constructing the same to possess good polyphase characteristics and therefore produce a high torque when the shading coils are effective. The desirable polyphase characteristics are attributable to the core type stator which enables substantially all of the available rotor iron to be threaded by useful flux and to be worked at relatively high density. The number and size of the inductor bars 31 of the rotor are also of considerable importance in the production of the proper torque, the combined cross-sectional area of the thirteen bars here employed being one-sixteenth of a square inch.

Of especial importance in attaining the desired polyphase characteristics is the provision between the side tips of the opposite poles of magnetic paths which are of continuous or at least substantially uninterrupted iron with their inner surfaces closely following the rotor surface. In the present instance, these connections are formed by the intermediate portions of the projections 20 which, as above described, are partially cut away to form the rotor cavity. The primary function of these magnetic connections is to enlarge the unshaded sections of the poles so that the predominating unshaded component of the magnetic field will be distributed to a larger amount of rotor iron and its full effect thereby utilized. In the performance of this function, the connections constitute extensions of the unshaded pole tips, which, for best results, is uninterrupted at least to the midpoint between the opposite poles and preferably beyond such line.

Preferably, as in the present instance, the magnetic connections are integral with and rigidly join the poles proper. Therefore, regardless of which side tip of the pole is the unshaded one, such tip extends uninterruptedly beyond the midpoint between the poles and distributes the unshaded flux component to the proper amount of effective rotor iron. The provision of such extensions is particularly important in the present instance owing to the necessity for providing relatively wide slots 26 for the shading coils. The extensions compensate for the reduction in the iron areas of the pole faces resulting from the use of the slots.

While it is preferable that the magnetic connections be uninterrupted between the opposite poles, the desired polyphase characteristics are obtained when the connections are interrupted by non-magnetic gaps or the like provided that such interruptions are very small such as a radial air gap narrower than one thirty-second of an inch. Where such interruptions are employed in the present reversing motor, they should be located in the magnetic connection midway between the poles because the unshaded pole section is formed by one end of the connection in one direction of rotation of the motor and by the other end during reverse rotation.

The provision of shading coils enclosing opposite side portions of the motor poles is desirable not only to obtain reversibility but also to enable an extremely abrupt stopping of the motor to be obtained by electromagnetic braking action. When the motor, constructed as above described, is running with one set of shading coils short-circuited, the rotor may be brought to a sudden stop simply by short-circuiting the other set of coils. In such a case, the currents induced in the coils 10 and 11 will produce a bucking action opposing the threading of unshaded flux through the pole areas enclosed by these coils so that the unshaded flux is diverted through the unenclosed sections formed by the projections 17 and 24. The magnetic field therefore becomes concentrated in these narrow projections and in effect ceases to rotate. The reaction of this field with the currents induced in the rotor bars results in the application of a powerful torque opposing the movement of the rotor. This braking action is also augmented by the strong attraction of the teeth 32 of the rotor by the strongly polarized projections 17 and 24 which, owing to their narrowness, constitute well defined poles when both sets of shading coils are effective.

The poor single phase action above referred to, that is, the tendency of the rotor to cease rotation when the active shading coil is open circuited with the main winding remaining energized, is the combined result of the poor motor action and the relatively high damping effect produced by certain structural features inherent in the present motor. Among the factors contributing to the losses in the motor and resulting in an increase in the damping action without detracting from the ability of the motor to run polyphase are the well defined character of the stator and rotor teeth, the low ratio of iron surface to the total surface of the rotor, the high flux densities employed, and the high resistance and low leakage reactance of the rotor. With such well defined teeth on the rotor and stator, local eddy currents are induced in the circuits formed by the inductor bars on either side of a rotor tooth as it approaches and leaves a stator tooth. Also due to the tooth construction, the well defined character thereof, and the high flux densities employed, the hysteresis and eddy current losses in the rotor are increased. The low ratio of iron to the total surface of the rotor resulting from the use of a relatively small motor with a toothed periphery decreases the effectiveness of the induced rotor current in producing the quadrature field. The comparatively high resistance of the rotor bars and the low leakage reactance of the rotor increase the generator action and therefore the damping effect.

I claim as my invention:

1. An alternating current induction motor combining a stator having a plurality of pole pieces, shading coils each composed of a plurality of turns and enclosing corresponding side portions of the different pole pieces so as to produce a shifting of the magnetic field around said rotor when the coils are short-circuited and said stator is energized, and a cylindrical rotor disposed between said pole pieces and comprising an iron core carrying a squirrel cage having inductor bars set in the periphery of said core and exposed at the rotor surface so that air gaps of substantial width are interposed in the local magnetic circuits around the individual bars.

2. An alternating current induction motor combining a stator, shading coils each composed of a plurality of turns and enclosing corresponding side portions of the different pole pieces so as to produce a shifting of the magnetic field around said rotor when the coils are short-circuited and said stator is energized, and a cylindrical rotor disposed between said pole pieces and comprising an iron core carrying a squirrel cage the inductor bars of which are set in the periphery of said core with the local magnetic circuits around the bars broken by non-magnetic interruptions of substantial width.

3. An alternating current motor combining a field member having a plurality of pole pieces, a primary winding adapted when excited to produce a magnetic field threading a plurality of shading coils composed of a plurality of turns and enclosing corresponding side portions of the different pole pieces so as to produce a shifting of the magnetic field around said rotor when the circuits for the corresponding coils on the different pole pieces are closed, and a cylindrical rotor disposed between said pole pieces and comprising an iron core carrying a squirrel cage having inductor bars of rectangular cross-section set in the peripheral portion of the core with one side surface substantially flush with the core surface.

4. A reversible alternating current induction motor combining a field member providing a pair of pole pieces, a squirrel cage rotor between said pole pieces, a primary winding for producing a magnetic field threading said pole pieces, a pair of shading coils having a plurality of turns and enclosing side portions of said pole pieces on diametrically opposite sides of said rotor, said coils when short-circuited producing a shifting of the magnetic field in one direction around said rotor, and a second pair of similarly constructed shading coils enclosing the other side portions of said pole pieces and producing an opposite shifting of the magnetic field, said motor being constructed to have inherently poor single phase characteristics such that the rotor will cease rotating when the circuits for all of said coils are interrupted and said winding remains energized.

5. An induction motor having a rotor of the squirrel cage type, a stator with a primary winding thereon adapted, when excited, to produce a magnetic field threading said rotor, a shading coil on said stator having a plurality of turns and adapted when short-circuited to cause a shifting of said magnetic field around the rotor, said motor possessing such poor single phase characteristics that it will cease rotation automatically as an incident to opening of the shading coil circuit while said winding continues to remain energized.

6. An induction motor combining a cylindrical rotor, a stack of laminations forming a two-pole stator of rectangular shape with a recess for said rotor in one side leg, a primary winding enclosing the other side leg of said stator, and a pair of preformed shading coils enclosing said first mentioned leg on diametrically opposite sides of the rotor, each of said laminations comprising two separate parts adapted to be brought together at butt joints, one of said parts having two substantially straight parallel projections adapted to be inserted through said shading coils and forming the four side portions of said two pole pieces.

7. In an alternating current induction motor of the core type, a laminated stator comprising a plurality of laminations each composed of two separately formed parts substantially L-shaped in form and fitted together to form a rectangle with joints at two of its diagonally opposite corners, the longer leg of one of said parts being apertured to define a cylindrical rotor recess.

8. In an alternating current induction motor of the core type, a laminated stator comprising a plurality of laminations each composed of two separately formed parts one providing two opposed pole pieces with a rotor recess therebetween, said parts, when fitted together, forming a rectangle with a joint at one corner adjacent said recess, and the alternate laminations being assembled in reverse relation so as to form two lapped joints in said pole pieces and spaced from said recess.

9. In an alternating current induction motor, a core type stator providing two opposed pole pieces with a rotor recess therebetween and composed of a stack of laminations each comprising two separately formed parts adapted to be brought together at butt joints spaced from said rotor recess, the portions of said laminations forming the four tips of said poles being integral with one of said parts.

10. An induction motor combining a squirrel cage rotor having weak single phase characteristics, a stator of the core type adapted to be energized by alternating current and having a plurality of pole pieces with faces exposed to said rotor, and a plurality of shading coils enclosing corresponding side portions of said pole pieces and each composed of at least one hundred turns of wire, said coils being connected in series relation and adapted when short-circuited with said stator excited to cause shifting of the magnetic field across said pole faces whereby to induce rotation of said rotor.

11. An induction motor combining a squirrel cage rotor having weak single phase characteristics, a stator of the core type adapted to be energized by alternating current and having a plurality of pole pieces with faces exposed to said rotor, and a plurality of shading coils enclosing corresponding side portions of said pole pieces and each composed of at least one hundred turns of wire, said coils acting when short-circuited with said stator excited to cause shifting of the magnetic field across said pole faces whereby to induce rotation of said rotor.

12. A reversible alternating current induction motor comprising a field member having a plurality of pole pieces, a rotor between said pole pieces, a winding for producing a magnetic field threading said pole pieces and rotor, two shading coils on at least one of said pole pieces enclosing different portions of the pole section on opposite sides thereof and each comprising a number of turns, the latter pole piece having two notches for receiving said coils and extending longitudinally of the pole piece with an intermediate section of the pole piece left unenclosed, said unenclosed section cooperating with one of the enclosed sections to form the unshaded portion of the pole piece when the shading coil on the other enclosed section is short-circuited.

13. An electric motor comprising a rotor element, a stator element adapted to be energized by alternating current and providing a plurality of pole pieces facing said rotor element, a shading coil enclosing one side portion of one of said pole pieces and adapted when short-circuited to produce shifting of the stator field across the face of such piece, said elements being constructed to provide inherently poor single phase characteristics whereby said rotor will cease to turn upon open-circuiting said shading coil while the motor is running.

14. An electric motor comprising a squirrel cage rotor, a stator providing a plurality of pole pieces facing said rotor and adapted to be energized by alternating current, and a plurality of shading coils enclosing corresponding side portions of said pole pieces adjacent said rotor and each comprising a plurality of turns and adapted to be short-circuited and open circuited, said rotor being constructed to possess low reactance whereby to produce low single phase characteristics in the motor causing said rotor to cease rotation upon open-circuiting said coils with the motor running.

15. An induction motor comprising, a rotor element, a stator element providing a plurality of pole pieces exposed to said rotor element and adapted when energized by alternating current to produce a magnetic field threading said rotor element, and an auxiliary winding comprising a large number of turns enclosing a portion of said stator element adjacent said rotor element, said auxiliary winding acting, when its circuit is closed, to produce a magnetic field cooperating with said first mentioned field to cause rotation of said rotor element, said elements coacting to produce sufficient damping action to bring said rotor to rest when said auxiliary winding is rendered ineffectual and said stator element remains energized.

16. An induction motor comprising, a squirrel cage rotor element, a stator element providing a plurality of pole pieces exposed to said rotor element and adapted when energized by alternating current to produce a magnetic field threading said rotor element, and an auxiliary winding of a plurality of turns enclosing a portion of said stator element adjacent said rotor element, said auxiliary winding acting, when its circuit is closed, to produce a magnetic field cooperating with said first mentioned field to cause rotation of said rotor element, at least one of said elements possessing such weak single phase characteristics that said rotor element will cease to turn when said auxiliary winding is rendered ineffectual while the stator element continues to remain energized.

17. A miniature motor suitable for control by delicate instruments, said motor comprising a rotor, a single phase stator, each pole comprising a split core for influencing said rotor, alternating current exciter windings for causing alternating flux in the poles and cores, open circuit forward and rear shading coils on said cores respectively, and means for selectively short circuiting the forward or rear shading coils, whereby the motor may be caused to rotate in either direction, said rotor being sufficiently small and the damping effect being sufficient during excitation by the exciter windings to stop the motor immediately when the shading coils are all open circuited.

18. A miniature motor comprising a rotor, a single phase stator comprising poles each comprising split cores, alternating current exciter windings for said poles, forward and rear shading coils on each of said cores respectively, switch means and conductors for at will selectively connecting diagonally opposite pairs of said coils in series circuit, whereby the motor may be caused to rotate in respectively opposite directions, said rotor being sufficiently small and the damping effect being sufficient during excitation to stop the rotor immediately when the shading coils are all open circuited.

19. A miniature motor comprising a rotor, a single phase stator comprising poles each comprising split cores, alternating current exciter windings for said poles, forward and rear shading coils on each of said cores respectively, a double throw switch having a movable element and point contacts, conductors connecting diagonally opposite pairs of said coils in series between said movable element and the respective fixed contacts of the switch, whereby the motor may be caused to rotate in respectively opposite directions by engaging said element with the one or the other of said contacts, the amount of current in said shading coils being sufficiently small to be controlled by said point contact when said movable switch element is controlled by the movable element of a delicate instrument, said rotor being sufficiently small and the damping effect being sufficient during excitation to stop the rotor immediately when the shading coils are all in the same circuit condition.

20. A miniature motor comprising a rotor, a single phase stator comprising poles each comprising split cores, alternating current exciter windings for said poles, forward and rear shading coils on each of said cores respectively, a double throw switch having a movable element, conductors connecting diagonally opposite pairs of said coils in series between said movable element and the respective fixed contacts of the switch, whereby the motor may be caused to rotate in respectively opposite directions by engaging said element with the one or the other of said contacts, said rotor being sufficiently small and the damping effect being sufficient during excitation to stop the rotor immediately when the shading coils are all open circuited, said double throw switch having a completely open position so that said shading coils may be simultaneously opened at once by a single movement of the movable element.

EDGAR D. LILJA.